(12) United States Patent
Skrbis et al.

(10) Patent No.: US 11,299,079 B1
(45) Date of Patent: Apr. 12, 2022

(54) ARMREST WITH CUSHIONED COMPONENT HAVING AN INTEGRATED AIR CHANNELING SYSTEM

(71) Applicant: Ford Global Technologies, LLC, Dearborn, MI (US)

(72) Inventors: Hannah Skrbis, Detroit, MI (US); Nicholas Mazzocchi, Ypsilanti, MI (US); Daniel Robert Staves, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 17/197,598

(22) Filed: Mar. 10, 2021

(51) Int. Cl.
  *A47C 7/72* (2006.01)
  *B60N 2/75* (2018.01)
  *B60N 2/56* (2006.01)

(52) U.S. Cl.
  CPC .......... B60N 2/79 (2018.02); B60N 2/5628 (2013.01); B60N 2/5642 (2013.01)

(58) Field of Classification Search
  CPC ...... B60N 2/5628; B60N 2/5642; B60N 2/56; B60N 2/5621
  See application file for complete search history.

(56) References Cited

U.S. PATENT DOCUMENTS

| | | | |
|---|---|---|---|
| 7,527,329 B2 * | 5/2009 | Alacqua | B60N 2/5628 297/180.13 |
| 8,276,986 B2 | 10/2012 | Kim | |
| 9,016,777 B2 * | 4/2015 | Oh | B60N 2/79 297/180.13 |
| 9,415,712 B2 | 8/2016 | Stoll et al. | |
| 9,463,747 B2 * | 10/2016 | Chen | B62D 25/087 |
| 9,925,896 B2 * | 3/2018 | Dinant | B60N 2/75 |
| 10,112,544 B2 * | 10/2018 | Catlin | B60N 2/793 |
| 10,343,565 B2 | 7/2019 | Baek et al. | |
| 10,357,955 B2 | 7/2019 | Ziolek | |
| 10,358,067 B2 * | 7/2019 | Dinant | B60N 2/793 |
| 10,744,914 B2 * | 8/2020 | Baek | B60N 2/5642 |
| 2004/0108751 A1 * | 6/2004 | Scheidmantal | B60N 2/42709 296/187.05 |
| 2008/0012398 A1 * | 1/2008 | Alacqua | B60N 2/5628 297/180.1 |
| 2011/0186560 A1 | 8/2011 | Kennedy et al. | |

(Continued)

*Primary Examiner* — Shin H Kim
(74) *Attorney, Agent, or Firm* — Vichit Chea; Price Heneveld LLP

(57) ABSTRACT

An armrest assembly includes a body portion having a cushioned component, wherein the cushioned component includes first and second portions spaced-apart from one another. The cushioned component includes a porous lattice matrix. A duct assembly includes a main inlet and first and second outlets that are operably coupled to the first and second portions of the cushioned component, respectively. The duct assembly further includes first and second channels fluidically coupled to the first and second outlets, respectively. An air diverter member is pivotally supported between first and second positions and includes a channel disposed therethrough. The channel of the air diverter member opens into the first channel when the air diverter member is in the first position, and opens into the second channel when the air diverter member is in the second position for directing airflow to the first and second outlets, respectively.

16 Claims, 7 Drawing Sheets

(56) References Cited

U.S. PATENT DOCUMENTS

| | | | |
|---|---|---|---|
| 2013/0153447 A1* | 6/2013 | Cinco | B60N 2/773 206/216 |
| 2013/0153717 A1* | 6/2013 | Cinco | B60N 2/773 248/118 |
| 2014/0175845 A1* | 6/2014 | Oh | B60N 2/757 297/180.14 |
| 2014/0175846 A1* | 6/2014 | Oh | B60N 3/104 297/180.14 |
| 2015/0079892 A1 | 3/2015 | Bauer et al. | |
| 2016/0090014 A1* | 3/2016 | Dinant | B60N 2/75 297/411.36 |
| 2016/0355110 A1* | 12/2016 | Bozio | B60N 2/773 |
| 2017/0267135 A9* | 9/2017 | Bozio | B60N 2/773 |
| 2017/0267183 A1* | 9/2017 | Catlin | B60R 7/04 |
| 2017/0325287 A1* | 11/2017 | Ji | B60H 1/2226 |
| 2018/0162250 A1* | 6/2018 | Dinant | B60N 2/793 |
| 2018/0201165 A1* | 7/2018 | Rekow | B60N 2/773 |
| 2018/0304790 A1* | 10/2018 | Patil | B60N 2/773 |
| 2018/0361891 A1* | 12/2018 | Kato | B60H 1/00285 |
| 2019/0084497 A1* | 3/2019 | Roth | B60N 2/806 |
| 2020/0109300 A1* | 4/2020 | Wu | B29C 64/106 |
| 2021/0023775 A1* | 1/2021 | Poelma | B29C 64/124 |
| 2021/0093090 A1* | 4/2021 | Deevers | A47C 7/029 |
| 2021/0348425 A1* | 11/2021 | Hodgson | E05B 77/06 |

\* cited by examiner

ARMREST WITH CUSHIONED COMPONENT HAVING AN INTEGRATED AIR CHANNELING SYSTEM

FIELD OF THE INVENTION

The present invention generally relates to an armrest assembly, and more particularly to an armrest assembly having a cushioned component with an integrated air channeling system for directing airflow therethrough.

BACKGROUND OF THE INVENTION

Adjustable comfort settings for an armrest are desired. An armrest assembly having an integrated air channeling system for directing airflow through a cushioned component of the armrest assembly provides users an adjustable temperature comfort setting for the armrest assembly while maintaining a desired profile and functionality.

SUMMARY OF THE INVENTION

According to one aspect of the present invention, an armrest assembly includes a body portion having a cushioned component, wherein the cushioned component includes first and second portions spaced-apart from one another. The cushioned component includes a porous lattice matrix. A duct assembly includes a main inlet and first and second outlets that are operably coupled to the first and second portions of the cushioned component, respectively. The duct assembly further includes first and second channels fluidically coupled to the first and second outlets, respectively. An air diverter member is pivotally supported between first and second positions and includes a channel disposed therethrough. The channel of the air diverter member opens into the first channel when the air diverter member is in the first position, and opens into the second channel when the air diverter member is in the second position for directing airflow to the first and second outlets, respectively.

According to another aspect of the present invention, an armrest assembly includes a cushioned component defined by a deformable and porous lattice matrix. A duct assembly includes at least one outlet operably coupled to the cushioned component. An armrest cover covers the cushioned component and includes a ventilated portion disposed over the at least one outlet.

According to yet another aspect of the present invention, an armrest assembly includes a body portion having an interior portion. A cushioned component is disposed over the interior portion and includes first and second portions spaced-apart from one another. The cushioned component is defined by a lattice matrix that is both deformable and porous. A duct assembly includes a main inlet and first and second outlets. The first and second outlets are operably coupled to the first and second portions of the cushioned component, respectively. The duct assembly includes first and second channels fluidically coupled to the first and second outlets, respectively. An air diverter member is pivotally supported on the duct assembly between the main inlet and the first and second outlets. The air diverter member includes a channel disposed therethrough. The channel of the air diverter member opens into the first channel when the air diverter member is in a first position, and the channel of the air diverter member opens into the second channel when the air diverter member is in a second position.

These and other aspects, objects, and features of the present invention will be understood and appreciated by those skilled in the art upon studying the following specification, claims, and appended drawings.

DETAILED DESCRIPTION OF THE PREFERRED EMBODIMENTS

Additional features and advantages of the present disclosure will be set forth in the detailed description which follows and will be apparent to those skilled in the art from the description, or recognized by practicing the invention as described in the following description, together with the claims and appended drawings.

As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

In this document, relational terms, such as first and second, top and bottom, and the like, are used solely to distinguish one entity or action from another entity or action, without necessarily requiring or implying any actual such relationship or order between such entities or actions.

The terms "substantial," "substantially," and variations thereof as used herein are intended to note that a described feature is equal or approximately equal to a value or description. For example, a "substantially planar" surface is intended to denote a surface that is planar or approximately planar. Moreover, "substantially" is intended to denote that two values are equal or approximately equal. In some embodiments, "substantially" may denote values within about 10% of each other, such as within about 5% of each other, or within about 2% of each other.

As used herein the terms "the," "a," or "an," mean "at least one," and should not be limited to "only one" unless explicitly indicated to the contrary. Thus, for example, reference to "a component" includes embodiments having two or more such components unless the context clearly indicates otherwise.

Figure 1:
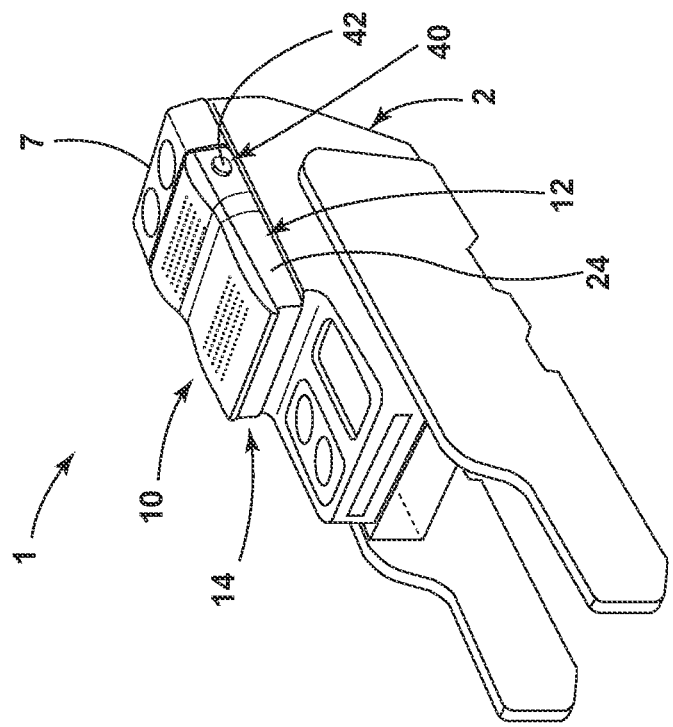
FIG. 1 is a top perspective view of a console assembly with an armrest assembly shown in a closed position.

For purposes of description herein, the terms "upper," "lower," "right," "left," "rear," "front," "vertical," "horizontal," and derivatives thereof shall relate to the disclosure as oriented in FIG. 1. Unless stated otherwise, the term "front" shall refer to the surface of the element closer to an intended viewer, and the term "rear" shall refer to the surface of the element further from the intended viewer. However, it is to be understood that the disclosure may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

Figure 2:
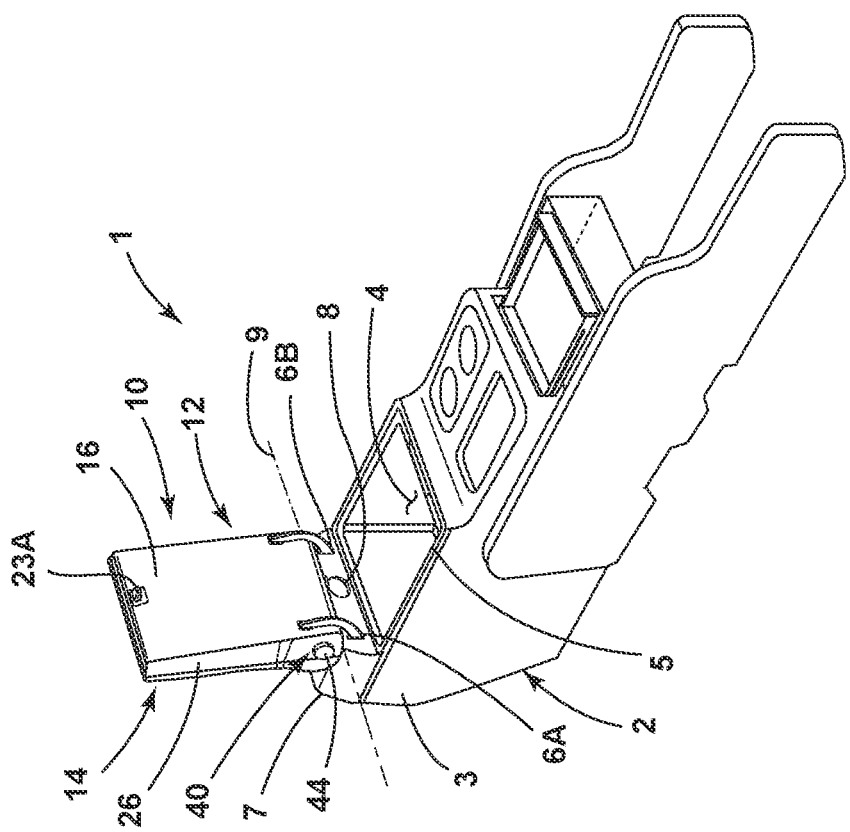
FIG. 2 is a top perspective view of the console assembly of FIG. 1 with the armrest assembly shown in an open position.

Referring now to FIGS. 1 and 2, a console assembly 1 is shown and contemplated for use in a vehicle interior. As shown in FIGS. 1 and 2, the console assembly 1 includes a support portion 2 that is configured to abuttingly support the console assembly 1 on a surface of the vehicle interior. The console assembly 1 further includes a console housing 3 that defines a storage compartment 4 having an open top portion 5. The console assembly 1 further includes an armrest assembly 10 that is hingedly coupled to the console housing 3 at a rear portion 7 thereof. As specifically shown in FIG. 2, the armrest assembly 10 is hingedly coupled to the rear portion 7 of the console housing 3 via first and second hinge assemblies 6A, 6B. In this way, the armrest assembly 10 selectively provides access to the storage compartment 4 by covering and pivoting away from the open top portion 5 of the storage compartment 4 as shown in FIGS. 1 and 2, respectively. Thus, the armrest assembly 10 is operable between open and closed positions as shown in FIGS. 2 and 1, respectively, along a pivot axis 9 that is substantially horizontal. Other pivot mechanisms are also contemplated for use with the present concept to hingedly couple the armrest assembly 10 to the console housing 3. The armrest assembly 10 includes a body portion 12 having an upper portion 14, which is contemplated to be a cushioned upper portion. While the armrest assembly 10 of the present concept is shown disposed on a console assembly 1 in FIGS. 1 and 2, it is contemplated that the armrest assembly 10 of the present concept can be provided on any component within a vehicle interior where an armrest is desired, such as a center console armrest, a rear console armrest, a door trim armrest, or an armrest provided on a seat assembly.

As further shown in FIG. 2, an air outlet 8 is revealed on the console housing 3 at the rear portion 7 thereof, when the armrest assembly 10 is in the open position. The air outlet 8 is contemplated to be fluidically coupled to an HVAC system of a vehicle in which the console assembly 1 is disposed. In this way, conditioned air can be provided to the console assembly 1 and to the armrest assembly 10 thereof, for distribution through the armrest assembly 10, as further described below. With the armrest assembly 10 in the open position of FIG. 2, a lower portion 16 of the body portion 12 can be seen having an engagement feature 23A of a latch mechanism 23 (FIG. 5) disposed thereon. In use, the engagement feature 23A latches the armrest assembly 10 to the console housing 3, to retain the armrest assembly 10 in the closed position, as shown in FIG. 1.

Figure 5:
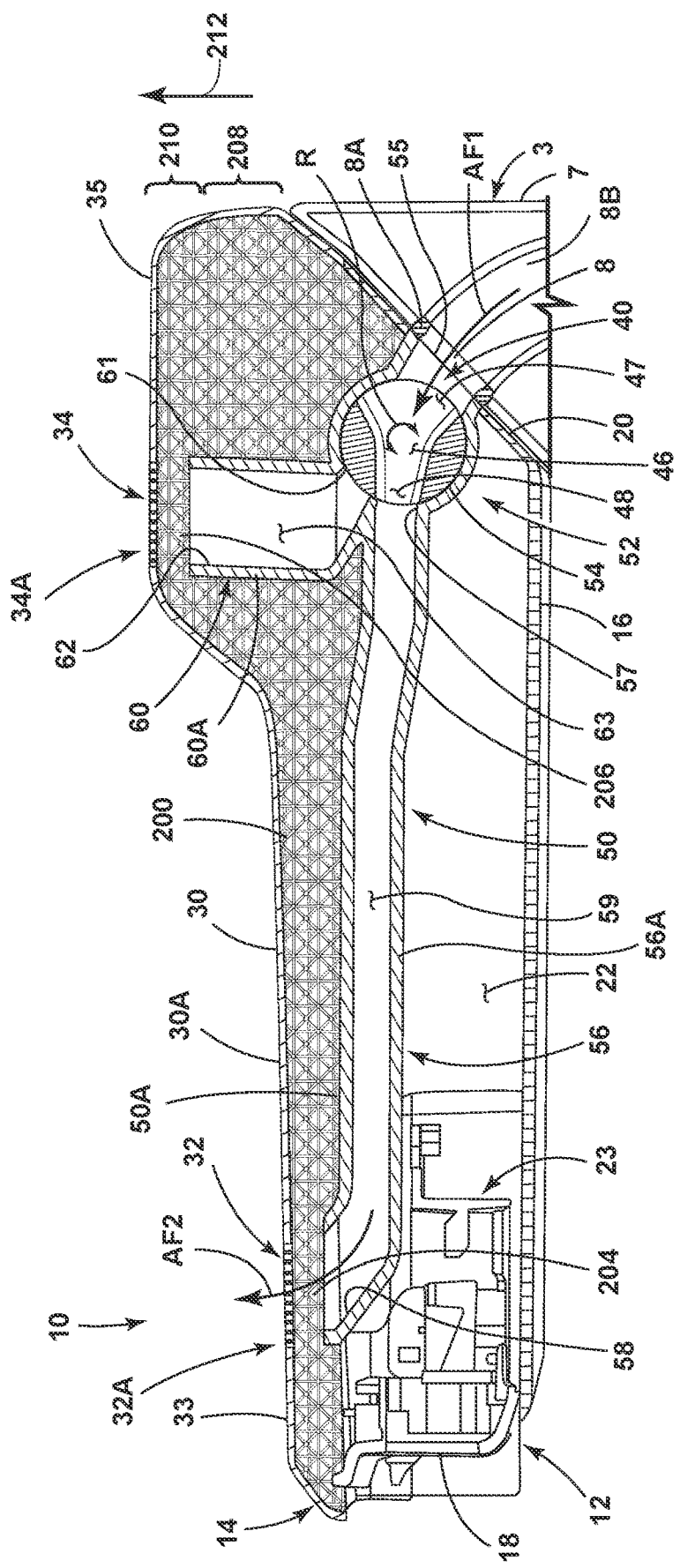
FIG. 5 is a cross sectional view of the armrest assembly of FIG. 3 taken at line V, showing an air diverter member disposed in a first position.

Referring now to FIG. 5, the armrest assembly 10 is shown with the body portion 12 which includes the upper portion 14, the lower portion 16, a front portion 18 and a rear portion 20. Together, the upper portion 14, lower portion 16, front portion 18 and rear portion 20 of the body portion 12 cooperate along with first and second sides 24, 26 (FIGS. 1 and 2) of the body portion 12 to define an interior portion 22 of the armrest assembly 10. In FIG. 5, a duct assembly 50 is shown disposed within the interior portion 22, along with the latch mechanism 23. As further shown in FIG. 5, the upper portion 14 of the body portion 12 is shown disposed over the interior portion 22. In use, the duct assembly 50 is used to direct airflow through the upper portion 14 of the armrest assembly 10, as further described below.

Figure 3:
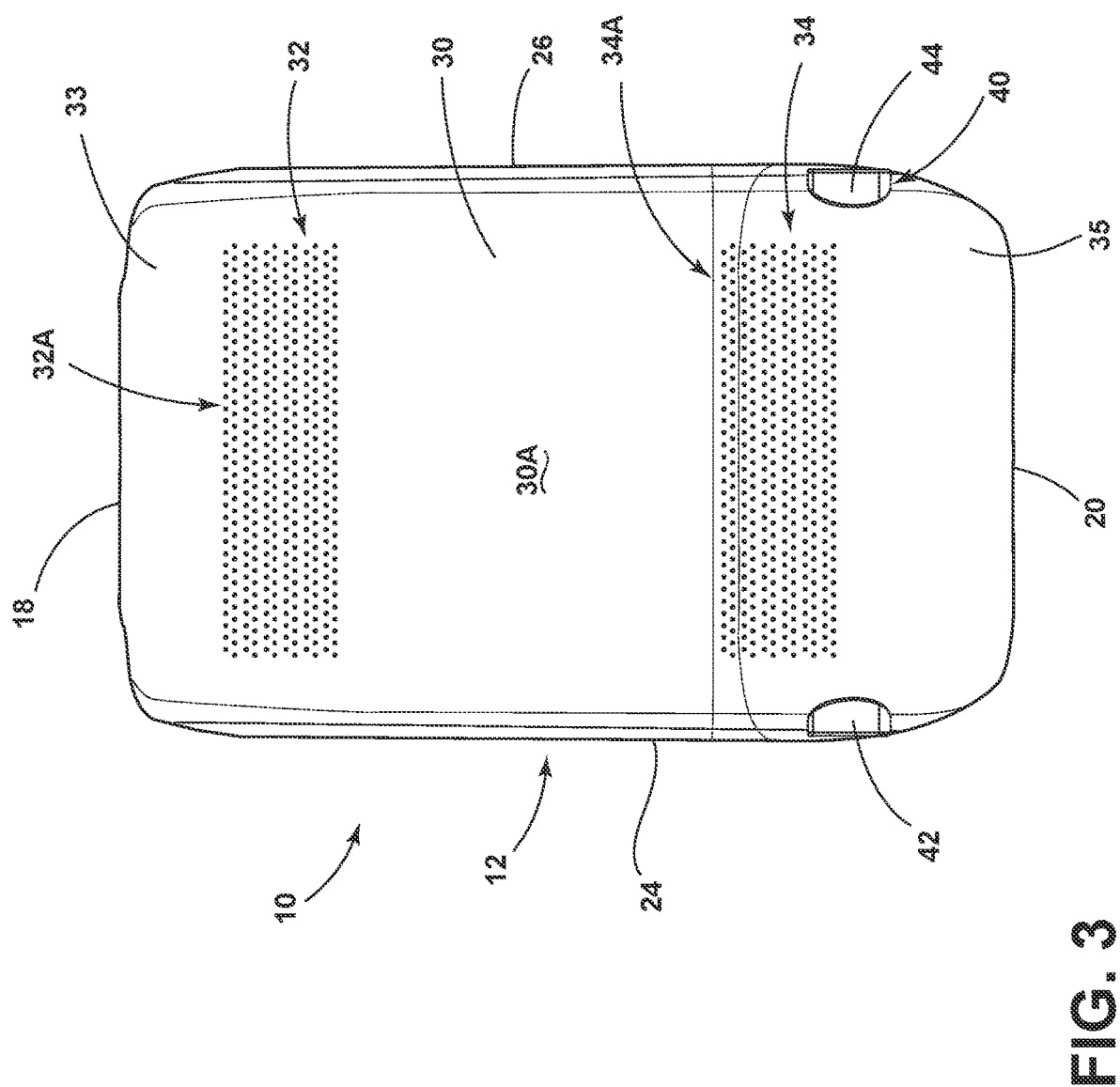
FIG. 3 is a top plan view of the armrest assembly of FIG. 1.

Referring now to FIG. 3, the armrest assembly 10 is shown from a top plan view, wherein the first and second sides 24, 26 of the body portion 12 are illustrated as opposed sides of the body portion 12 relative to one another. An armrest cover 30 is shown covering the upper portion 14 of the armrest assembly 10. An outer contact surface 30A is provided by the armrest cover 30 and is configured to be engaged or contacted by an arm of a vehicle occupant seated adjacent to the armrest assembly 10. The armrest cover 30 may be comprised of a suitable natural or synthetic material, such as leather, imitation leather, vinyl, clothe, polymeric material, or any combination thereof, that generally covers cushioned materials within a vehicle. The armrest cover 30 may also be an integrated component of the cushioning materials disposed within the armrest assembly 10, as further described below. As further shown in FIG. 3, the armrest cover 30 includes a first ventilated portion 32 disposed on a front portion 33 of the armrest cover 30, and a second ventilated portion 34 spaced-apart from the first ventilated portion 32 and disposed on a rear portion 35 of the armrest cover 30. Thus, the first and second ventilated portions 32, 34 of the armrest cover 30 are spaced-apart from one another along the armrest assembly 10 at the upper portion 14 thereof to define front and rear ventilated portions. The first and second ventilated portions 32, 34 of the armrest cover 30 may be defined by a perforated or breathable material to allow airflow through the armrest assembly 10, as further described below. In FIG. 3, the first and second ventilated portions 32, 34 of the armrest cover 30 each include a plurality of apertures 32A, 34A, respectively, disposed therethrough. The plurality of apertures 32A, 34A provide access to cushioned materials of the armrest assembly 10, as further described below.

With further reference to FIG. 3, an air diverter member 40 is shown having first and second knobs 42, 44 disposed on and accessible from the first and second sides 24, 26, respectively, of the body portion 12 of the armrest assembly 10. Specifically, the first and second knobs 42, 44 of the air diverter member 40 outwardly extend from the first and second sides 24, 26 of the body portion 12 of the armrest assembly 10. In this way, a vehicle occupant seated adjacent to the first side 24 of the body portion 12 of the armrest assembly 10 can engage the first knob 42 for selectively directing airflow towards the first ventilated portion 32 or the second ventilated portion 34 of the armrest cover 30. Similarly, a vehicle occupant seated adjacent to the second side 26 of the body portion 12 of the armrest assembly 10 can engage the second knob 44 for selectively directing airflow towards the first ventilated portion 32 or the second ventilated portion 34 of the armrest cover 30. The first and second knobs 42, 44 being accessible from the opposed first and second sides 24, 26 of the body portion 12 of the armrest assembly 10 is further shown in FIGS. 1 and 2, respectively. Using the air diverter member 40 to direct airflow along the armrest assembly 10 is further described below.

Figure 4:
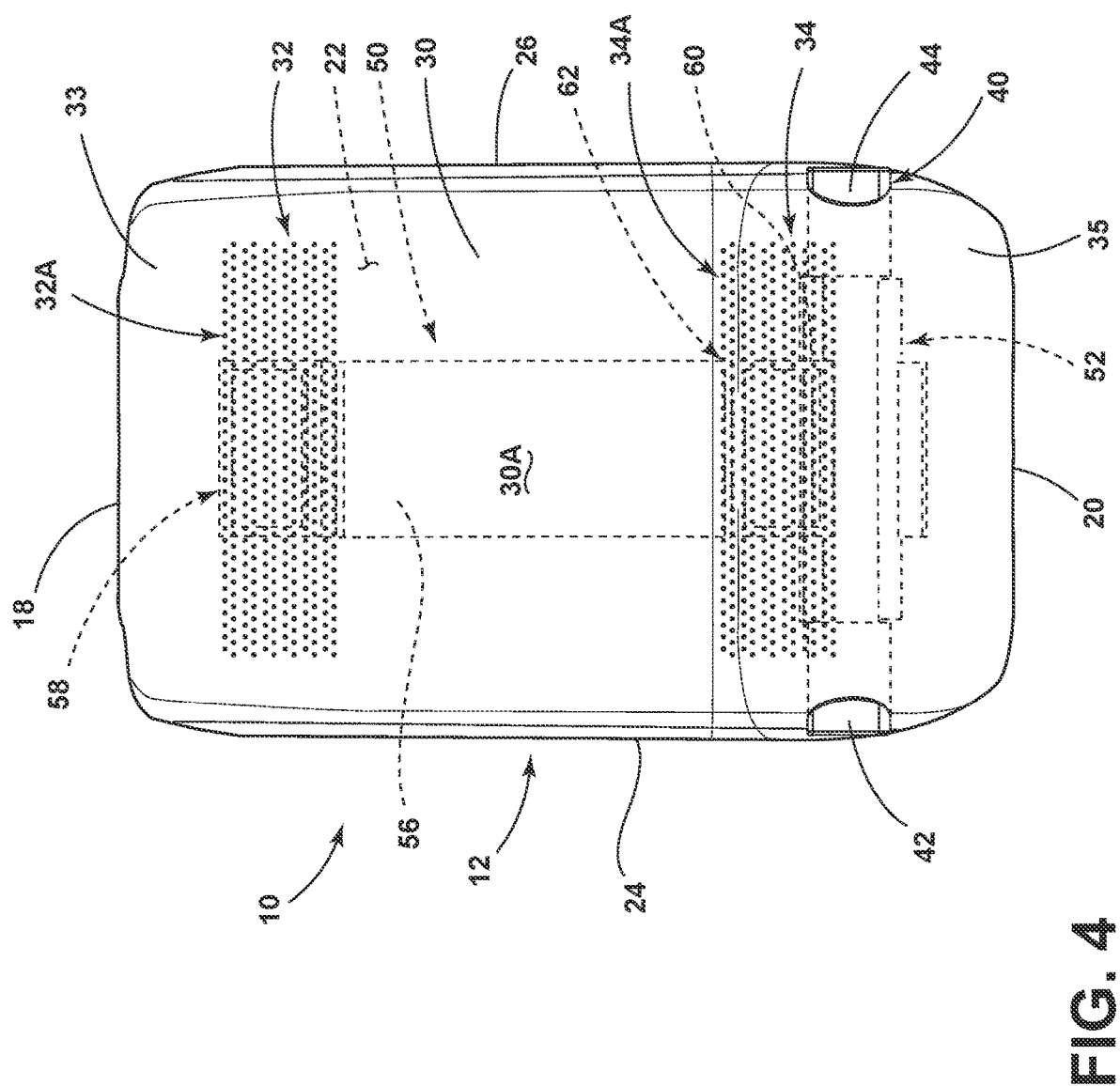
FIG. 4 is a top plan view of the armrest assembly of FIG. 3 with an integrated air channeling system shown in phantom in the form of a duct assembly.

Referring now to FIG. 4, the armrest assembly 10 is again shown from a top plan view, wherein the duct assembly 50 is illustrated in phantom as positioned within the interior portion 22 of the armrest assembly 10. As shown in FIG. 4, the duct assembly 50 includes a rear portion 52 having a receiving space 54 (FIG. 5) disposed therethrough, wherein the air diverter member 40 is rotatably disposed within the receiving space 54 for rotation between first and second positions. It is contemplated that the air diverter member 40 can be rotatably or pivotally supported on the duct assembly 50 or the body portion 12 of the armrest assembly 10. The duct assembly 50 includes first and second outlets 58, 62 with a first channel 56 leading from the rear portion 52 to the first outlet 58. As shown in FIG. 4, the first and second outlets 58, 62 align with the first and second ventilated portions 32, 34 of the armrest cover 30 for delivery of air therethrough.

Referring now to FIG. 5, the duct assembly 50 is better illustrated as having the first channel 56 shown with an inlet 57 defining a first end of the first channel 56, and the first outlet 58 defining a second end of the first channel 56 with a hollow interior portion 59 disposed therebetween. The hollow interior portion 59 of the first channel 56 is surrounded by a sidewall 56A that is contemplated to be a solid non-porous sidewall so that airflow through the first channel 56 is efficiently provided. Thus, the inlet 57 and the first outlet 58 are fluidically coupled to one another through the hollow interior portion 59 of the first channel 56. Similarly, the second channel 60 is shown in FIG. 5 with an inlet 61 defining a first end of the second channel 60, and the second outlet 62 defining a second end of the second channel 60 with a hollow interior portion 63 disposed therebetween. The hollow interior portion 63 of the second channel 60 is surrounded by a sidewall 60A that is contemplated to be a solid non-porous sidewall so that airflow through the second channel 60 is efficiently provided. Thus, the inlet 61 and the second outlet 62 are fluidically coupled to one another through the hollow interior portion 63 of the second channel 60. The inlets 57, 61 of the first and second channels 56, 60 are disposed adjacent to the rear portion 52 of the duct assembly 50, wherein the air diverter member 40 is rotatably housed. The duct assembly 50 includes a main inlet 55 that aligns with the outlet 8 disposed on the rear portion 7 of the console housing 3 when the armrest assembly 10 is in the closed position, as shown in FIG. 5. A compressible gasket 8A may surround the outlet 8 to form a sealed arrangement between the outlet 8 and the main inlet 55. It is further contemplated that the compressible gasket 8A may be positioned around the main inlet 55 for providing the sealed condition between the console housing 3 and the armrest assembly 10. In FIG. 5, an airway 8B is shown leading to outlet 8. Airway 8B is contemplated to be fluidically coupled to the HVAC system of the vehicle in which the console assembly 1 is disposed. In this way, air form the HVAC system of the vehicle is directed to the console assembly 1 and to the armrest assembly 10 when the armrest assembly 10 is in the closed position.

As air enters the main inlet 55, air is directed to a channel 46 disposed through the air diverter member 40. Specifically, air enters the channel 46 through an inlet 47 that is aligned with the main inlet 55 to provide air to the channel 46. The channel 46 of the air diverter member 40 further includes an outlet 48 which, in the embodiment shown in FIG. 5, is aligned with the inlet 57 of the first channel 56 of the duct assembly 50, such that the channel 46 of the air diverter member 40 opens into the first channel 56 of the duct assembly 50. Thus, it is contemplated that the air diverter member 40 is shown in the first position in FIG. 5, wherein air from the HVAC system of the vehicle is directed through the channel 46 of the air diverter member 40 to the first channel 56 of the duct assembly 50 along the path as indicated by arrow AF1, to provide conditioned air to the first outlet 58 of the first channel 56. Air is then directed from the first outlet 58 of the first channel 56 to a cushioned component 200 that is comprised of a lattice matrix 202, which is contemplated to be a porous lattice matrix, as further described below. Specifically, air is delivered through the first channel 56 of the duct assembly 50 to a first portion 204 of the porous lattice matrix 202 of the cushioned component 200 where the first outlet 58 is operably coupled. Being a porous member, the cushioned component 200 provides for air to be delivered through the first portion 204 thereof to the first ventilated portion 32 of the armrest cover 30 along the path as indicated by arrow AF2. Air exits the armrest assembly 10 through the plurality of apertures 32A disposed at the first ventilated portion 32 of the armrest cover 30, which is disposed over the first outlet 58 of the duct assembly 50, to provide a comfort setting to the user. It is further contemplated the armrest assembly 10 may not include the armrest cover 30, such that the first and second portions 204, 206 of the lattice matrix 202 may be exposed portions that are not covered by a cover skin. Thus, in such an embodiment, air would exit the armrest assembly 10 directly at the first and second portions 204, 206 of the lattice matrix 202.

Figure 6:
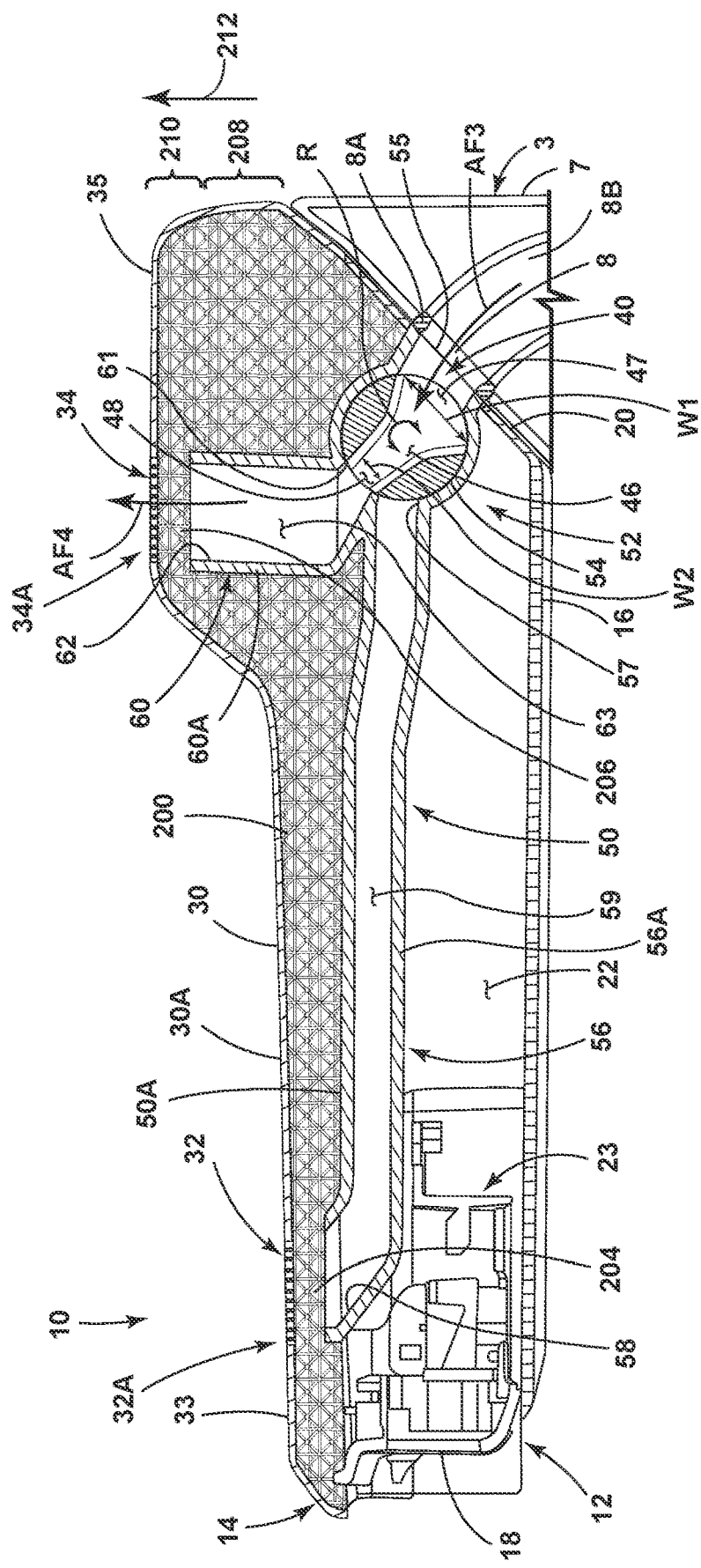
FIG. 6 is a cross sectional view of the armrest assembly of FIG. 3 taken at line V, showing the air diverter member disposed in a second position.

The air diverter member 40 may be rotatably coupled to the rear portion 52 of the duct assembly 50 at the receiving space 54 thereof for rotation along the rotational path as indicated by arrow R. In this way, the air diverter member 40 is positioned between the main inlet 55 and the first and second outlets 58, 62 of the duct assembly 50. Thus, the air diverter member 40 can be rotated in a clockwise direction from the first position, as shown in FIG. 5, to a second position, as shown in FIG. 6 when a user engages one of the first and second knobs 42, 44 of the air diverter member 40. With reference to FIG. 6, the air diverter member 40 is shown in the second position. As illustrated in FIGS. 5 and 6, the inlet 47 of channel 46 of the air diverter member 40 defines an opening having a width W1 which is greater than a width W2 of an opening defined by the outlet 48. Thus, the channel 46 of the air diverter member 40 includes a first end, defined by the inlet 47, which is larger than a second end, defined by the outlet 48. In this way, as the air diverter member 40 rotates from the first position to the second position, and vice versa, the channel 46 remains in fluid communication with the main inlet 55 of the duct assembly 50, given the increased width of the inlet 47. Said differently, the main inlet 55 of the duct assembly 50 aligns with the inlet 47 of the channel 46 of the air diverter member 40 when the air diverter member 40 is in either the first position or the second position, as shown in FIGS. 5 and 6, respectively. In contrast, as the air diverter member 40 rotates from the first position to the second position, the narrower opening of the outlet 48 moves from alignment with the first channel 56 of the duct assembly 50, to alignment with the second channel 60 of the duct assembly 50. It is contemplated that the air diverter member 40 can move to an intermediate position between the first and second positions, in which both the first and second channels 56, 60 of the duct assembly are partially provided with conditioned air through the air diverter member 40.

With further reference to FIG. 6, wherein the air diverter member 40 is shown in the second position, air enters the main inlet 55 and is directed to the channel 46 disposed through the air diverter member 40. Specifically, with the air diverter member 40 in the second position, air again enters the channel 46 through the inlet 47 that is aligned with the main inlet 55 to provide air to the channel 46. Further, with the air diverter member 40 in the second position, the outlet 48 of the channel 46 of the air diverter member 40 aligns with the inlet 61 of the second channel 60 of the duct assembly 50, along the path as indicated by arrow AF3. Thus, with the air diverter member 40 in the second position, the channel 46 of the air diverter member 40 opens into the second channel 60 of the duct assembly 50. After exiting the air diverter member 40 through the outlet 48, air is then directed to the inlet 61 of the second channel 60 and is then delivered to the second outlet 62 of the second channel 60. From the second outlet 62 of the second channel 60, air is directed to a second portion 206 of the porous lattice matrix 202 of the cushioned component 200. In a similar manner as noted above, air is delivered through the porous lattice matrix 202 of the cushioned component 200 at the second portion 206 thereof, and through the second ventilated portion 34 of the armrest cover 30 along the path as indicated by arrow AF4, when the air diverter member 40 is in the second position, as shown in FIG. 6. Air exits the armrest assembly 10 through the plurality of apertures 34A disposed at the second ventilated portion 34 of the armrest cover 30, which is disposed over the second outlet 62 of the duct assembly 50, to provide another comfort setting to the user.

Thus, the armrest assembly 10 of the present concept provides for an integrated air channeling system via the duct assembly 50 and the cushioned component 200, such that airflow can be directed by a user towards the front portion 33 or the rear portion 35 of the armrest cover 30 which covers the cushioned component 200, as shown in FIGS. 5 and 6. In accordance with the present concept, the first and second portions 204, 206 of the cushioned component 200 are spaced-apart from one another to provide front and rear air delivery options. Thus, the first outlet 58 of the duct assembly 50 is operably coupled to the cushioned component 200 at the first portion 204 of the cushioned component 200. Similarly, the second outlet 62 of the duct assembly 50 is operably coupled to the cushioned component 200 at the second portion 206 of the cushioned component 200. The armrest cover 30 covers the cushioned component 200, and is specifically configured such that the first ventilated portion 32 (and the plurality of apertures 32A thereof) is disposed over the first outlet 58 and the first portion 204 of the cushioned component 200. The armrest cover 30 is also configured such that the second ventilated portion 34 (and the plurality of apertures 34A thereof) are disposed over the second outlet 62 and the second portion 206 of the cushioned component 200. As used herein, the term "disposed over" means to cover an item (partially or entirely) in a vertically aligned manner. The porous nature of the cushioned component 200 allowing for air delivery therethrough will now be described.

As noted above, the cushioned component 200 is contemplated to be comprised of a lattice matrix 202. The lattice matrix 202 is contemplated to be created using an additive manufacturing technique. As used herein, the term "lattice matrix" refers to a structural pattern of interconnected links and nodes that define cells or voids therebetween, wherein the overall pattern resembles an expanded material configuration. Specifically, the term "lattice matrix" refers to a structural pattern of interconnected links and nodes with voids therebetween that define 3D cells, such that the lattice matrix is a porous structure suitable for accommodating airflow therethrough. The cushioned components discussed herein are contemplated to be comprised of a single material used in an additive manufacturing process to form the lattice matrices thereof into monolithic structures. In this way, the cushioned components of the present concept include fully integrated component parts comprised of a common material that define overall monolithic structures. As used herein, the term "integrated" refers to component parts of a unitary whole that are formed together to provide the monolithic structure of the overall article. In this way, the term "integrated" is used herein to describe component parts that are formed together as a unitary whole, as opposed to components that are separately formed and later operably coupled to one another in assembly. As used herein, the term "monolithic structure" is used to describe a structure that is integrally created in a forming process, such as an additive manufacturing technique. Additive manufacturing techniques contemplated for use with the present concept may include 3D printing, laser sintering and other known additive manufacturing techniques that may use a common build material provided in a layer-by-layer deposition process, and cured to provide sufficient structure. In this way, the monolithic structures of the present concept provide unitary structures comprised of multiple configurations and features. It is noted that the monolithic structures of the present concept may include of a single or common material used in the additive manufacture of the structure. Further, the cushioned components of the present concept are not only monolithic in structure, but may be configured to provide variated elastic moduli within lattice matrices thereof. As used herein, the term "elastic modulus" is used to describe a relative hardness of a cushioned component or the lattice matrix thereof. Elastic moduli are comparable between components, wherein a greater elastic modulus describes a component part that has reduced deflection capabilities as compared to a component part with increased deflection capabilities (i.e. lesser elastic modulus). Thus, the cushioned components, or the lattice matrices thereof, of the present concept include parts having elastic moduli that vary from one another to provide variated comfort settings. An elastic modulus takes into account a degree of deflection of a part under a given force and can be expressed as a softness or a hardness of the part. The higher the elastic modulus, the higher the stiffness or rigidity of the component part of the cushioned components described herein.

Further, as used herein, the term "deformable" refers to a component that is considered to have a cushioning effect, such that the component is compressible when under pressure from an applied force. The term "deformable" is also used herein to describe a component part that is flexibly resilient. In this way, a deformable component part is contemplated to a be a part that can be compressed from an at-rest condition to a compressed condition under a compression force, and is further contemplated to resiliently return to the at-rest condition from the compressed condition after the compression force is removed. Thus, a deformable lattice matrix described herein acts as a cushioning component of the armrest assembly 10. It is contemplated that the lattice matrix 202 of the cushioned component 200 is a porous member for allowing airflow therethrough, and is also a deformable member for providing a cushioning effect, as further described below.

Figure 7:
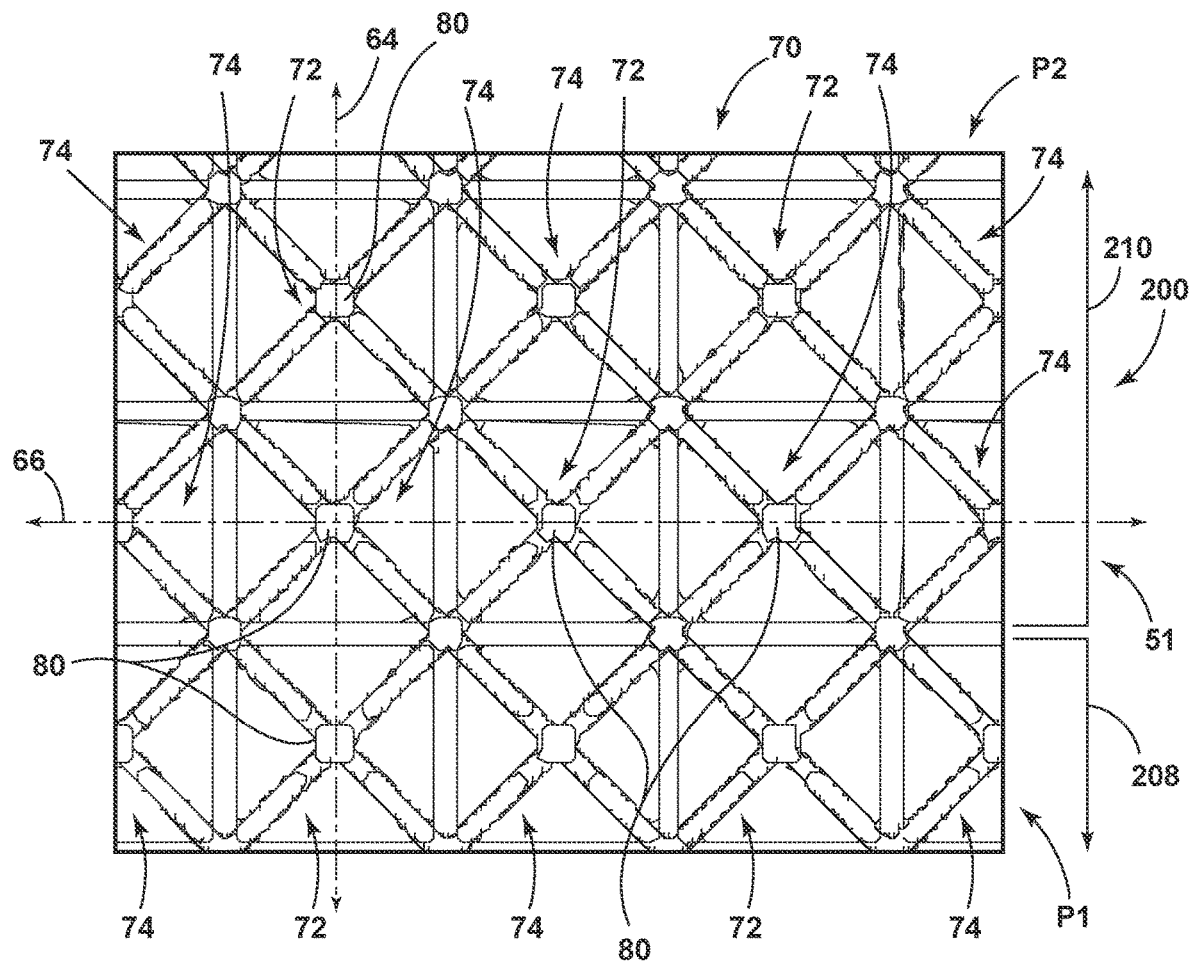
FIG. 7 is a side elevation view of a portion of a lattice matrix.

As shown in FIGS. 5 and 6, the lattice matrix 202 of the cushioned component 200 may include multiple layers in the form of a base layer 208 and an upper layer 210 disposed on top of the base layer 208. It is further contemplated that the layers of the lattice matrix 202 may include more layers than just the base layer 208 and the upper layer 210 shown in FIGS. 5 and 6. The base layer 208 and the upper layer 210 of the lattice matrix 202 of the cushioned component 200 define inner and outer layers of the lattice matrix 202, respectively. The base layer 208 and the upper layer 210 of the lattice matrix 202 of the cushioned component 200 shown in FIGS. 5 and 6 are contemplated to be comprised of a plurality of three-dimensional (3D) cells 70, as shown in FIG. 7. The plurality of 3D cells 70 is comprised of a number of different 3D cells having unique properties, as further described below. In the view of FIG. 7, a portion of the lattice matrix 202 is shown. Specifically, portions of the upper layer 210 and the base layer 208 of the lattice matrix 202 are shown comprised of a number of 3D cells 72, 74. As shown in FIG. 7, both the upper layer 210 and the base layer 208 of the lattice matrix 202 each include 3D cells 70. The 3D cells of the upper layer 210 of the lattice matrix 202 are represented by the reference numeral 72. The base layer 208 of the lattice matrix 202 includes 3D cells represented by the reference numerals 72 and 74. Thus, the upper layer 210 of the lattice matrix 202 is contemplated to be a homogenous layer comprised of 3D cells 72 that each include an elastic modulus that is akin to a soft deflectable cushioning member as provided by the 3D cells 72.

With further reference to FIG. 7, the base layer 208 of the lattice matrix 202 includes 3D cells 72, as well as 3D cells 74. In this way, the base layer 208 of the lattice matrix 202 includes 3D cells from two different groups of 3D cells. Specifically, the 3D cells 72 represent a first group of 3D cells, while the 3D cells 74 represent a second group of 3D cells. The 3D cells 74 of the second group of 3D cells are contemplated to have a higher elastic modulus as compared to the 3D cells 72 of the first group of 3D cells. Thus, the base layer 208 of the lattice matrix 202 is contemplated to have a higher overall elastic modulus, as compared to the overall elastic modulus of the upper layer 210 of the lattice matrix 202, as the base layer 208 of the lattice matrix 202 includes the 3D cells 74 having the higher elastic modulus as compared to the 3D cells 72. In this way, the base layer 208 of the lattice matrix 202 is a stiffer more rigid part of the lattice matrix 202, as compared to the cushioning upper layer 210 of the lattice matrix 202.

Figure 8:
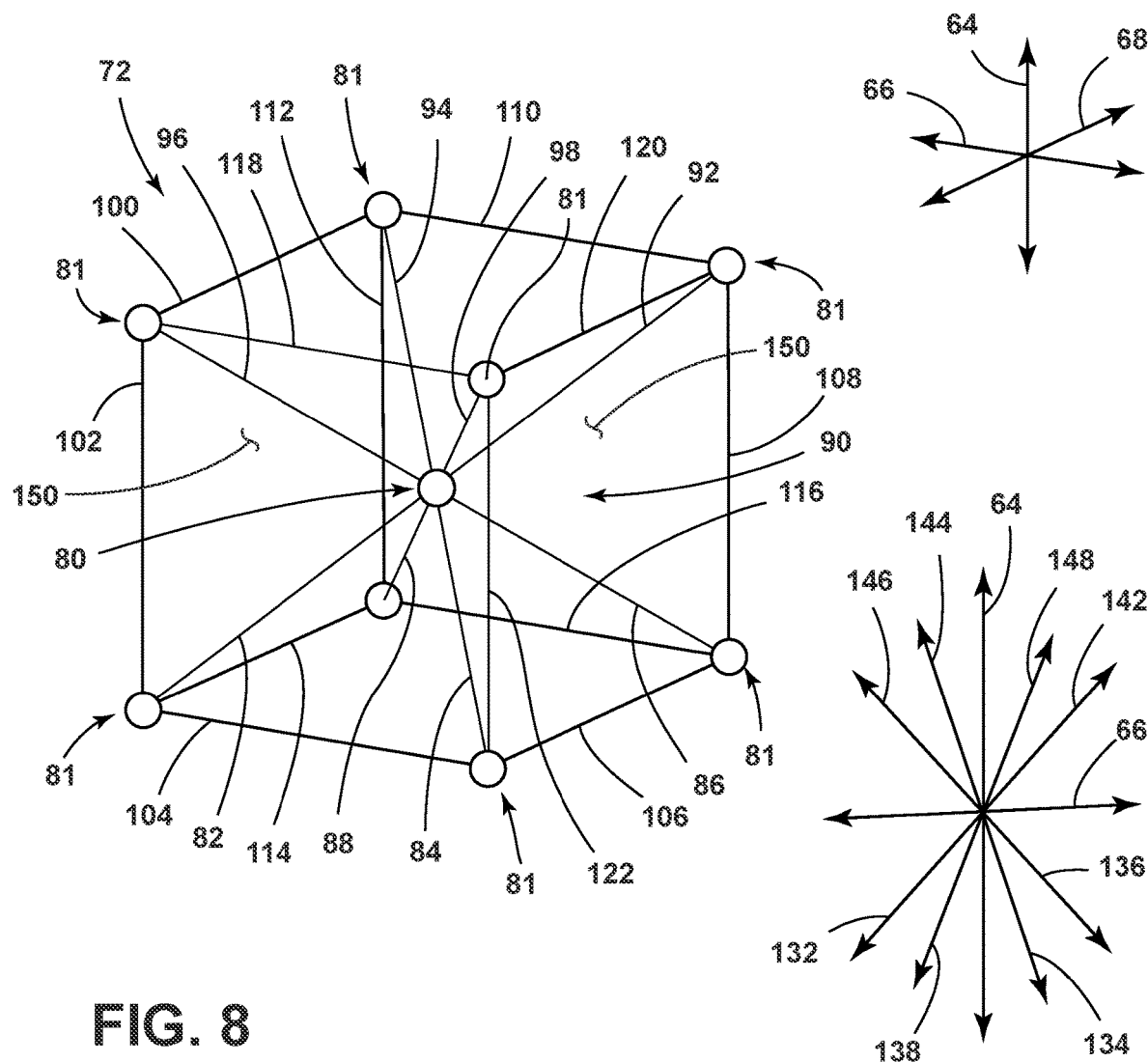
FIG. 8 is a top perspective schematic view of a 3D cell of a lattice matrix.

In the exemplary portion of the lattice matrix 202 shown in FIG. 7, various patterns are shown for the placement of 3D cells 72, 74 of the first and second groups of 3D cells 72, 74. As specifically shown in FIG. 7, the lattice matrix 202 includes an overall pattern P of links and nodes that defines the structure of the lattice matrix 202. As further shown in FIG. 7, the base layer 208 of the lattice matrix 202 includes a pattern P1 of 3D cells 72 and 3D cells 74. Specifically, the base layer 208 of the lattice matrix 202 shown in FIG. 7 illustrates an alternating pattern P1 of 3D cells 72 and 3D cells 74. It is contemplated that any pattern of 3D cells may be used at any layer of the lattice matrix 202, so long as a stiffness gradient is provided in order of increasing stiffness from the upper layer 210 of the lattice matrix 202, to the base layer 208 of the lattice matrix 202. In the exemplary portion of the lattice matrix 202 shown in FIG. 7, the 3D cells 72, 74 are arranged in a cubic arrangement and are aligned along the vertical direction 64 and the horizontal direction 66. The 3D cells 72, 74 are also contemplated to be aligned in a longitudinal direction 68 (FIG. 8). The directions 64, 66 and 68 are contemplated to be mutually orthogonal.

As shown in FIGS. 7 and 8, the 3D cells 72, 74 include nodes 80 that are aligned with one another. The directions 64, 66 and 68 are identified in FIG. 8 to help define the structure of the 3D cells 72, 74 described herein, and do not necessarily correspond to the actual vertical, horizontal, and longitudinal directions of the lattice matrix 202 in which the 3D cells 72, 74 are used. Further, it is contemplated that the upper layer 210 and the base layer 208 of the lattice matrix 202 may each include a homogenous set of 3D cells having the varying elastic moduli, as discussed above, to provide the stiffness gradient defined from the upper layer 210 to the base layer 208. It is also contemplated that the upper layer 210 and the base layer 208 of the lattice matrix 202 may each include a mixture of 3D cells having varying elastic moduli, yet still provide the stiffness gradient defined from the upper layer 210 to the base layer 208. In FIGS. 5 and 6, a stiffness gradient of decreasing stiffness is shown in the direction as indicated by arrow 212 from the base layer 208 to the upper layer 210. Similarly, a stiffness gradient of increasing stiffness is contemplated in the opposite direction of arrow 212 from the upper layer 210 to the base layer 208.

Referring now to FIG. 8, a 3D cell is shown in schematic form to provide a sense of the overall structure a 3D cell used with the present concept may include. The 3D cell shown in FIG. 8 is represented by the reference numeral 72, however, it is contemplated that the 3D cells 74 may include a similar structure as the exemplary structure shown in FIG. 8. As specifically shown in FIG. 8, the 3D cell 72 includes a node 80 that is generally centrally disposed. A plurality of links 90 outwardly extending from the node 80 in various directions. Specifically, links 82, 84, 86 and 88 of the plurality of links 90 extend downwardly from the node 80 in the respective directions as indicated by arrows 132, 134, 136 and 138. Links 92, 94, 96 and 98 of the plurality of links 90 extend upwardly from the node 80 in the respective directions as indicated by arrows 142, 144, 146 and 148. As further shown in FIG. 8, links 100, 102, 104, 106, 108, 110, 112, 114, 116, 118 and 120 represent outwardly extending links from adjacent nodes 81. The interplay of the plurality of links 90 provides for the elastic modulus of the 3D cell 72. The spaces shown between the nodes 80, 81 and the plurality of links 90 define voids 150 that are spaced throughout the lattice matrix 202, such that the lattice matrix 202 is porous. As a porous structure, the lattice matrix 202 is breathable to allow for airflow therethrough. The spaces or voids 150 defined by the 3D cell 72 also allow the lattice matrix 202 to deflect or deform under an applied pressure. Thus, the plurality of links 90 are interconnected with one another, yet spaced-apart from one another to define the voids 150 therebetween into which the plurality of links 90 can deform or deflect into. In this way, the lattice matrix 202 is not only a porous lattice matrix, but also a deformable lattice matrix.

With further reference to FIGS. 5 and 6, the duct assembly 50 includes a top portion 50A that abuts an underside of the cushioned component 200. It is contemplated that the cushioned component 200 and the duct assembly 50 may be integrated parts defining and monolithic structure. Specifically, it is contemplated that the cushioned component 200 and the duct assembly 50 may be formed using a common material in an additive manufacturing technique, so that the cushioned component 200, and the lattice matrix 202 thereof, is formed as an integrated monolithic part with the duct assembly 50, and the air diverter member 40 thereof. Further, it is contemplated that the armrest cover 30 can be an integrated part of the cushioned component 200, and the lattice matrix 202 thereof, to define a monolithic structure as being formed from a common build material in an additive manufacturing process.

According to one aspect of the present invention, an armrest assembly includes a body portion having a cushioned component, wherein the cushioned component includes first and second portions spaced-apart from one another. The cushioned component includes a porous lattice matrix. A duct assembly includes a main inlet and first and second outlets that are operably coupled to the first and second portions of the cushioned component, respectively. The duct assembly further includes first and second channels fluidically coupled to the first and second outlets, respectively. An air diverter member is pivotally supported between first and second positions and includes a channel disposed therethrough. The channel of the air diverter member opens into the first channel when the air diverter member is in the first position, and opens into the second channel when the air diverter member is in the second position for directing airflow to the first and second outlets, respectively.

Embodiments of the first aspect of the invention can include any one or a combination of the following features:
- the channel of the air diverter member includes an inlet and an outlet.
- the inlet of the channel of the air diverter member includes a width that is greater than a width of the outlet of the channel of the air diverter member.
- the main inlet of the duct assembly aligns with the inlet of the channel of the air diverter member when the air diverter member is in the first position.
- the main inlet of the duct assembly aligns with the inlet of the channel of the air diverter member when the air diverter member is in the second position.
- the air diverter member includes first and second knobs outwardly extending from opposed first and second sides of the body portion, respectively.
- an armrest cover disposed over the cushioned component and having front and rear portions. The front portion includes a front ventilated portion defined by a plurality of apertures. The rear portion includes a rear ventilated portion defined by a plurality of apertures.
- the front ventilated portion of the armrest cover is disposed over the first outlet of the duct assembly, and further wherein the rear ventilated portion of the armrest cover is disposed over the second outlet of the duct assembly.
- the lattice matrix, the duct assembly and the armrest cover are integrated components defining a monolithic structure.

According to another aspect of the present invention, an armrest assembly includes a cushioned component defined by a deformable and porous lattice matrix. A duct assembly includes at least one outlet operably coupled to the cushioned component. An armrest cover covers the cushioned component and includes a ventilated portion disposed over the at least one outlet.

Embodiments of the second aspect of the invention can include any one or a combination of the following features:
- the lattice matrix includes a stiffness gradient defined by multiple layers of the lattice matrix having decreased stiffness as directed from a base layer of the lattice matrix to an upper layer of the lattice matrix.
- the lattice matrix includes a base layer and an upper layer disposed on top of the base layer. The base layer includes an elastic modulus that is higher than an elastic modulus of the upper layer.
- the cushioned component and the duct assembly are integrated components defining a monolithic structure.

According to yet another aspect of the present invention, an armrest assembly includes a body portion having an interior portion. A cushioned component is disposed over the interior portion and includes first and second portions spaced-apart from one another. The cushioned component is defined by a lattice matrix that is both deformable and porous. A duct assembly includes a main inlet and first and second outlets. The first and second outlets are operably coupled to the first and second portions of the cushioned component, respectively. The duct assembly includes first and second channels fluidically coupled to the first and second outlets, respectively. An air diverter member is pivotally supported on the duct assembly between the main inlet and the first and second outlets. The air diverter member includes a channel disposed therethrough. The channel of the air diverter member opens into the first channel when the air diverter member is in a first position, and the channel of the air diverter member opens into the second channel when the air diverter member is in a second position.

Embodiments of the third aspect of the invention can include any one or a combination of the following features:
- an armrest cover covering the cushioned component and having a front ventilated portion defined by a plurality of apertures, and a rear ventilated portion spaced-apart from the front ventilated portion and defined by a plurality of apertures.
- the front ventilated portion of the armrest cover is vertically aligned with the first outlet of the duct assembly. The rear ventilated portion of the armrest cover is vertically aligned with the second outlet of the duct assembly.
- the lattice matrix includes a base layer and an upper layer disposed on top of the base layer. The base layer includes an elastic modulus that is higher than an elastic modulus of the upper layer.
- the channel of the air diverter member includes an inlet and an outlet. The inlet of the channel of the air diverter member includes a width that is greater than a width of the outlet of the channel of the air diverter member. The main inlet of the duct assembly aligns with the inlet of the channel of the air diverter member when the air diverter member is in the first position and when the air diverter member is in the second position.
- the cushioned component, the duct assembly and the air diverter member are integrated components defining a monolithic structure.
- the lattice matrix includes a stiffness gradient defined by multiple layers of the lattice matrix having increased stiffness as directed from an outer layer of the lattice matrix to an inner layer of the lattice matrix.

It is to be understood that variations and modifications can be made on the aforementioned structure without departing from the concepts of the present invention, and further it is to be understood that such concepts are intended to be covered by the following claims unless these claims by their language expressly state otherwise.

What is claimed is:

1. An armrest assembly, comprising:
a body portion having a cushioned component, wherein the cushioned component includes first and second portions spaced-apart from one another, and further wherein the cushioned component includes a lattice matrix that is porous;
a duct assembly having a main inlet and first and second outlets, wherein the first and second outlets are operably coupled to the first and second portions of the cushioned component, respectively, and further wherein the duct assembly includes first and second channels fluidically coupled to the first and second outlets, respectively; and
an air diverter member pivotally supported on the body portion between first and second positions, wherein the air diverter member includes a channel disposed therethrough, such that the channel of the air diverter member opens into the first channel when the air diverter member is in the first position, and further wherein the channel of the air diverter member opens into the second channel when the air diverter member is in the second position.

2. The armrest assembly of claim 1, wherein the channel of the air diverter member includes an inlet and an outlet.

3. The armrest assembly of claim 2, wherein the inlet of the channel of the air diverter member includes a width that is greater than a width of the outlet of the channel of the air diverter member.

4. The armrest assembly of claim 3, wherein the main inlet of the duct assembly aligns with the inlet of the channel of the air diverter member when the air diverter member is in the first position.

5. The armrest assembly of claim 4, wherein the main inlet of the duct assembly aligns with the inlet of the channel of the air diverter member when the air diverter member is in the second position.

6. The armrest assembly of claim 1, wherein the air diverter member includes first and second knobs outwardly extending from opposed first and second sides of the body portion, respectively.

7. The armrest assembly of claim 1, including:
an armrest cover disposed over the cushioned component and having front and rear portions, wherein the front portion includes a front ventilated portion defined by a plurality of apertures, and further wherein the rear portion includes a rear ventilated portion defined by a plurality of apertures.

8. The armrest assembly of claim 7, wherein the front ventilated portion of the armrest cover is disposed over the first outlet of the duct assembly, and further wherein the rear ventilated portion of the armrest cover is disposed over the second outlet of the duct assembly.

9. The armrest assembly of claim 8, wherein the lattice matrix, the duct assembly and the armrest cover are integrated components defining a monolithic structure.

10. An armrest assembly, comprising:
a body portion having an interior portion;
a cushioned component disposed over the interior portion, wherein the cushioned component includes first and second portions spaced-apart from one another, and further wherein the cushioned component is defined by a lattice matrix that is both deformable and porous;
a duct assembly having a main inlet and first and second outlets, wherein the first and second outlets are operably coupled to the first and second portions of the cushioned component, respectively, and further wherein the duct assembly includes first and second channels fluidically coupled to the first and second outlets, respectively; and
an air diverter member pivotally supported on the duct assembly between the main inlet and the first and second outlets, wherein the air diverter member includes a channel disposed therethrough, and further wherein the channel of the air diverter member opens into the first channel when the air diverter member is in a first position, and further wherein the channel of the air diverter member opens into the second channel when the air diverter member is in a second position.

11. The armrest assembly of claim 10, including:
an armrest cover covering the cushioned component and having a front ventilated portion defined by a plurality of apertures, and a rear ventilated portion spaced-apart from the front ventilated portion and defined by a plurality of apertures.

12. The armrest assembly of claim 11, wherein the front ventilated portion of the armrest cover is vertically aligned with the first outlet of the duct assembly, and further wherein the rear ventilated portion of the armrest cover is vertically aligned with the second outlet of the duct assembly.

13. The armrest assembly of claim 10, wherein the lattice matrix includes a base layer and an upper layer disposed on top of the base layer, and further wherein the base layer includes an elastic modulus that is higher than an elastic modulus of the upper layer.

14. The armrest assembly of claim 10, wherein the channel of the air diverter member includes an inlet and an outlet, and further wherein the inlet of the channel of the air diverter member includes a width that is greater than a width of the outlet of the channel of the air diverter member, and further wherein the main inlet of the duct assembly aligns with the inlet of the channel of the air diverter member when the air diverter member is in the first position and when the air diverter member is in the second position.

15. The armrest assembly of claim 4, wherein the cushioned component, the duct assembly and the air diverter member are integrated components defining a monolithic structure.

16. The armrest assembly of claim 14, wherein the lattice matrix includes a stiffness gradient defined by multiple layers of the lattice matrix having increased stiffness as directed from an outer layer of the lattice matrix to an inner layer of the lattice matrix.

* * * * *

UNITED STATES PATENT AND TRADEMARK OFFICE
CERTIFICATE OF CORRECTION

PATENT NO. : 11,299,079 B1
APPLICATION NO. : 17/197598
DATED : April 12, 2022
INVENTOR(S) : Skrbis et al.

It is certified that error appears in the above-identified patent and that said Letters Patent is hereby corrected as shown below:

In the Claims

Column 14:
Claim 15, Line 39;
"claim 4" should be --claim 10--.
Claim 16, Line 43;
"claim 14" should be --claim 10--.

Signed and Sealed this
Seventh Day of June, 2022

Katherine Kelly Vidal
*Director of the United States Patent and Trademark Office*